March 1, 1960     J. J. SPERO     2,926,818
DISPENSER FOR DISPENSING A PLURALITY OF MATERIALS
Filed July 14, 1958     2 Sheets-Sheet 1
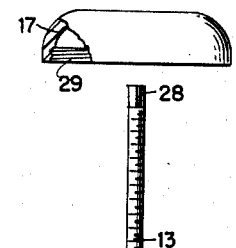
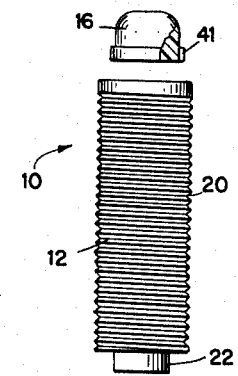
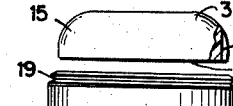
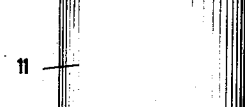
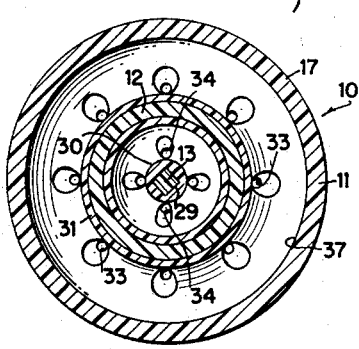
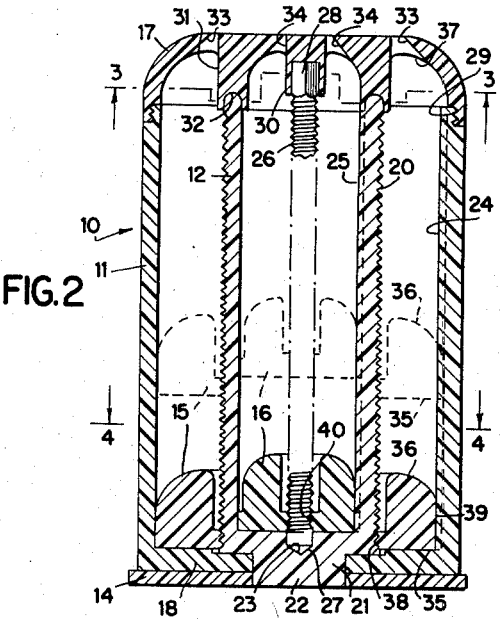
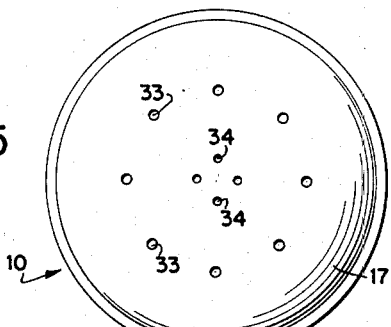
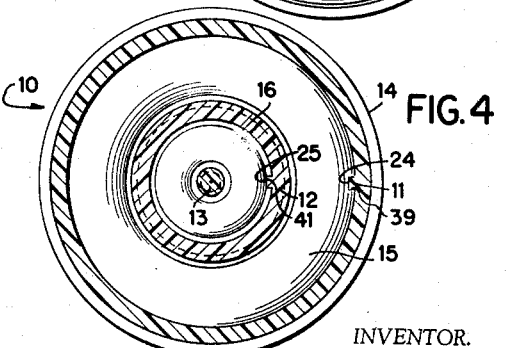
INVENTOR.
John J. Spero
BY
Adams, Forward and McLean
ATTORNEYS March 1, 1960 J. J. SPERO 2,926,818
DISPENSER FOR DISPENSING A PLURALITY OF MATERIALS
Filed July 14, 1958 2 Sheets-Sheet 2

INVENTOR.
John J. Spero
BY
Adams, Forward and McLean
ATTORNEYS.

United States Patent Office 2,926,818
Patented Mar. 1, 1960

2,926,818
DISPENSER FOR DISPENSING A PLURALITY OF MATERIALS

John J. Spero, Mount Vernon, N.Y.

Application July 14, 1958, Serial No. 748,505

5 Claims. (Cl. 222—135)

My invention relates to the containing and dispensing of fluent materials and in particular provides a container-dispenser for separately containing and simultaneously dispensing two or more materials.

Many materials which are to be simultaneously employed are frequently reactive wtih each other, at least to the extent that they deteriorate upon prolonged contact and consequently must be separately contained. The simultaneous employment of such materials, however, in many cases makes it desirable that such materials be contained in a single package from which they can be dispensed simultaneously.

It is, accordingly, a principal object of my invention to provide a container for separately containing such materials and from which they are simultaneously dispensed by simple mechanical action. It is a further object of my invention to provide such a container-dispenser in which the dispensing function is smooth and even and in which the separately contained materials are dispensed simultaneously in fixed proportion one to the other.

These and other objects of my invention which will be more fully apparent hereinafter are essentially obtained by employing a pair of coaxial barrels such that one material to be dispensed can be contained in the annular space between barrels and the other material can be contained in the central space within the inner barrel. Each such container space is fitted with a separate piston or plunger which is slidable lengthwise of the space in sealing contact with the walls thereof to expel the contents of each container space through one end of the coaxial, double barrel arrangement which is capped with a perforate head providing separate channels for expulsion of the contents of the barrels or providing a common dispensing orifice for such expulsion. The inner barrel is mounted in a manner permitting its rotation within the outer barrel, and centrally the arrangement is provided with a shaft which is arranged to rotate with the outer barrel. Thus the piston in the annular space by being keyed to rotate with one wall defining the space and threaded to engage the other wall defining the space is caused to move lengthwise within the annular space by relative rotation of the two barrels. Similarly the inner piston moves lengthwise through the central space by relative rotation of the central shaft and inner barrel. By employing the same number of threads per inch on the threaded surface engaging the pistons the pistons can be moved at the same speeds simultaneously, thus each completes a full stroke lengthwise of the two barrels with the same number of turns of rotation between the barrels. Basically the apparatus is completed by providing an external operator extending through an end of the outer barrel which is affixed to the inner barrel.

Thus the apparatus is operated to dispense the materials separately contained in the annular and central spaces by manually rotating the operator relative to the outer barrel. It will be apparent that the operator can be located at one end of the double barrel arrangement with the dispensing head at the other end or the dispensing head can be the operator. In either case the operator can be provided with a series of radial arms and the outer barrel can carry a stop-bar overlying the path of travel of such arms thus enabling dispensing measured quantities by simply dialing one or more arms around to the stop-bar as disclosed and claimed in copending application S.N. 748,442, filed July 14, 1958, in the name of Leonard L. Marraffino.

For a more complete understanding of the practical application of the principles of my invention reference is made to the appended drawings in which:

Figure 1 is an exploded elevation of a container-dispenser constructed in accordance with the principles of my invention;

Figure 2 is a vertical section of the container-dispenser of Figure 1 shown in assembled form;

Figure 3 is a cross-section taken at line 3—3 in Figure 2;

Figure 4 is a cross-section taken at line 4—4 in Figure 2;

Figure 5 is a plan view of the container-dispenser shown in Figures 1–4;

Figure 7:
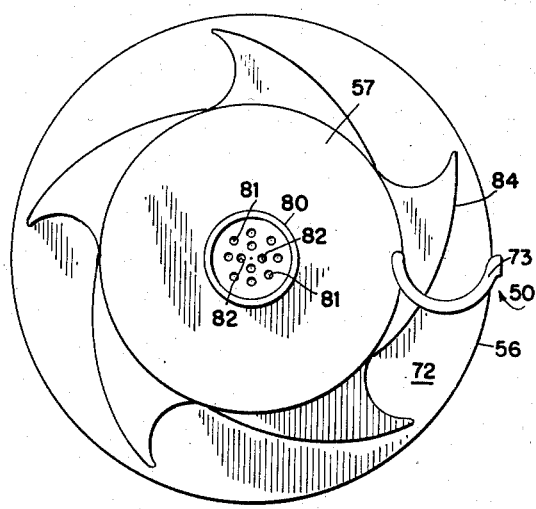
Figure 7 is a plan view of the container-dispenser shown in Figure 6.

Referring more particularly to Figures 1–5, the reference numeral 10 designates a container-dispenser constructed in accordance with my invention. Container-dispenser 10 includes basically an outer barrel 11, an inner barrel 12, a central shaft 13, an annular, disk shaped operator 14 located at one end of the assembled construction, an annular piston 15 located between barrels 11 and 12, a smaller annular piston 16 located within barrel 12 and about shaft 13, and a dispensing head 17.

Outer barrel 11 is a cylindrical length of clear, rigid plastic material and is partially closed at one end by an integral annular flange 18. At its other end barrel 11 is completely open and is externally provided with threads 19.

Inner barrel 12 is also a cylindrical length of clear, rigid plastic material having a smaller diameter than that of barrel 11 and which is provided with a left hand thread 20 extending along substantially its entire cylindrical exterior surface. At one end inner barrel 12 is completely closed by an integral bottom 21, which on its exterior side carries a coaxial hub 22 and which on its interior side is provided with a coaxial well 23.

Barrels 11 and 12 are assembled together with barrel 12 coaxially positioned within barrel 11, with bottom 21 abutting the inner side of flange 18 on barrel 11 and with hub 22 projecting through the central opening in annular flange 18. It will be further noted that along its interior side barrel 11 carries a boss 24 which extends lengthwise of barrel 11 parallel to the axis of barrel 11 thus defining a key. Similarly barrel 12 is provided with lengthwise boss 25 also defining a key.

Shaft 13, which is constructed of clear, rigid plastic material, is threaded, as indicated by the reference numeral 26, substantially throughout its entire length with a right hand thread. At one end shaft 13 is provided with a smooth conical point 27 and at the other end with a short length having a square cross-section as denoted by the reference numeral 28. Shaft 13 is positioned along the common axis of barrels 11 and 12 with its smooth conical point 27 rotatably received in well 23 in bottom 21 of inner barrel 12.

The adjacent open ends of barrels 11 and 12 are closed by dispensing head 17 which like barrels 11 and 12 is also constructed of clear, rigid plastic material. Dispensing head 17 has a smooth curved shaped exterior and on its interior (underside) about its periphery is provided with threads 29 which rotatably engage threads 19 on barrel 11 to a tight fit holding dispensing head 17 fixed on barrel 11.

Centrally, on its interior (under) side, dispensing head 17 carries a depending sleeve 30 which defines a well having a square cross-section fitting over the square end 28 of shaft 13, thus retaining shaft 13 in fixed position relative to barrel 11. The underside of dispensing head 17 also carries an annular boss 31 having a groove 32 extending about its under edge which, when dispensing head 17 is tightly fitted on barrel 11, firmly receives the open upper end of inner barrel 12 in sliding but sealing contact. At arcuate intervals about dispensing head 17 between its threaded inner rim 29 and annular boss 32 dispensing head 17 is provided with a series of apertures 33 providing expelling passages leading to the exterior of the assembly from the annular space between barrels 11 and 12. The dispensing head 17 is also provided with a series of apertures 34 located between annular boss 32 and sleeve 30 which provide expelling passages leading from the central space within inner barrel 12.

Annular piston 15, which is constructed of opaque, rigid plastic material, on its underside 35 is shaped to fit across the bottom of barrel 11 between barrel 11 and barrel 12 against flange 18 and on its upper surface 36 is shaped to fit within the annular cavity 37, on the underside of dispensing head 17 which lies between threaded rim 29 of dispensing head 17 and annular boss 31 and into which expelling passages 33 lead. The central opening in piston 15 is supplied with internal threads 38 which rotatably engage the left hand threads 20 on the outer surface of inner barrel 12. Piston 15 is also provided with a lengthwise (vertical) slot 39 on its outer edge which mates with key 24. Thus rotation of inner barrel 12 within outer barrel 11 in a counter-clockwise direction (as viewed from dispensing head 17) will cause piston 15 to rise upwardly through the annular space between barrels 11 and 12.

The smaller piston 16, which like piston 15 is constructed of opaque, rigid plastic material, is similarly provided with an underside for fitting flat against the bottom of inner cylinder 12 with its upper side contoured to fit within the cavity on the underside of dispensing head 17 surrounding sleeve 30 and within annular boss 31. Piston 16, which like piston 15 is also centrally apertured, is provided with internal threads 40 in such central aperture which threadedly are received on threads 26 of shaft 13. Piston 16 is also provided with a short lengthwise (vertical) slot 41 which is received on key 25. Thus rotation of inner barrel 12 within outer barrel 11 to which shaft 13 is affixed by a square connection 28, 30 also causes piston 16 to rise within the central space in barrel 12 when barrel 12 is rotated in a counter-clockwise direction as seen from its upper end.

The device is completed by affixing disk-like operator 14 on the underside of flange 18 with its central aperture receiving the lower end of hub 22 on barrel 12. Suitably, operator 14 is keyed and cemented to hub 22.

Operation of the device shown in Figures 1-5 is apparent from the previous description. Dispensing head 17 is simply unscrewed. With pistons 15, 16 positioned at the lower end of container-dispenser 10 one material to be dispensed having a suitable fluent consistency is then charged into the central space within barrel 12 filling barrel 12, and the other material to be dispensed suitably having a similar consistency is charged into the annular space between barrels 11 and 12. Dispensing head 17 is then re-threaded into position, and simultaneous dispensing of both charged materials is accomplished by rotating operator 14 in a clockwise direction, as seen from the bottom of container-dispenser 10, thereupon simultaneously forcing pistons 15 and 16 toward the dispensing end (see dashed line position in Figure 2) and forcing the fluent contents of the device simultaneously through expelling passages 33 and 34.

Figure 8:
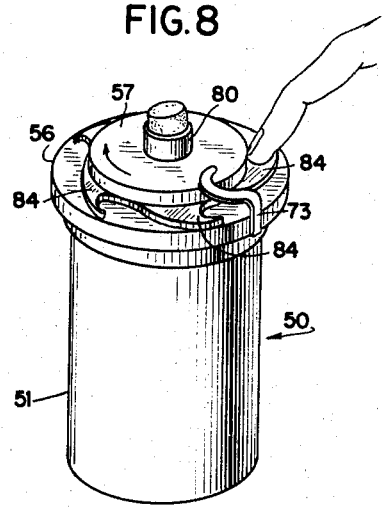
Figure 8 is a perspective view of the container-dispenser shown in Figures 6 and 7.
Figure 6:
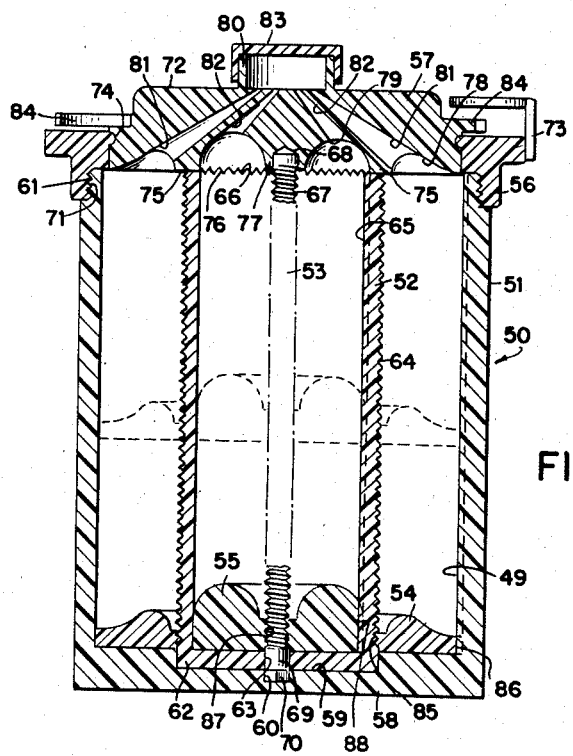
Figure 6 is a vertical section of another container-dispenser constructed in accordance with the principles of my invention.

Referring more particularly to Figures 6-8, the reference numeral 50 designates another container-dispenser constructed in accordance with the principles of my invention for simultaneously dispensing two separately contained fluent pastes or creams. In the arrangement of Figures 6-9 the construction is almost identical to that of Figures 1-5 except that the dispensing head also functions as the control member and is modified to permit dispensing of the contained materials in predetermined quantities in accordance with the above-mentioned Marraffino application.

Container-dispenser 50 includes an outer barrel 51, an inner barrel 52, a central shaft 53, an annular piston 54, a smaller annular piston 55, a receiving ring 56 and a dispensing head 57.

Barrel 51 is a cylindrical container constructed of clear, rigid plastic material having an open top and a closed bottom 58. Internally bottom 58 of barrel 51 is provided with a shallow well 59 circular in cross-section and having a diameter approximately half that of barrel 51. Well 59 is centrally located on the inner bottom 58 and at its center there is located a second well 60 having relatively short transverse dimensions and which is square in cross-section. At its open upper end barrel 51 is externally threaded as indicated by the reference numeral 61, and throughout its cylindrical length, the interior surface of barrel 51 is provided with a boss 49 which extends vertically and functions as a key.

Inner barrel 52 is a cylindrical container constructed of clear, rigid plastic material having a substantially closed bottom 62. The external diameter of barrel 52 is just less than the diameter of well 59 in barrel 51, such that barrel 52 rests with its bottom 62 received in well 59 in a close sliding fit and thus is positioned coaxially within barrel 51. At its center bottom 62 of barrel 52 is provided with an axial bore 63 which registers with well 60 in bottom 58 of barrel 51. The external cylindrical surface of barrel 52 throughout substantially the entire length of barrel 52 is provided with a right hand thread indicated by the reference numeral 64. Interiorly barrel 52 is provided with a boss 65 which extends longitudinally the entire length of barrel 52 and functions as a key. The open upper end of barrel 52 terminates with a series of radial splines 66.

Shaft 53, which is constructed of clear, rigid plastic material, is provided with a left hand thread 67 substantially throughout its length. At one end it is provided with a smooth conical point 68, and at its other end it is provided with a short, smooth cylindrical portion 69 terminating in a square cross-section portion 70. Shaft 53 is positioned on the common axis of barrels 51 and 52 with its square cross-sectioned end 70 resting in square cross-sectioned well 60 in bottom 58 of barrel 51, with its cylindrical portion 69 adjacent to end portion 70 extending through bore 63 in the bottom 62 of barrel 52 and with its smooth conical point 68 at the upper end of the assembly.

Receiving ring 56 for dispensing head 57 is a generally annular piece of rigid, plastic material which is interiorly threaded at its lower end as indicated by the reference numeral 71 for threaded engagement with threads 61 on the upper end of barrel 51. The upper side of receiving ring 56 provides a flat annular surface 72 which extends inwardly partly over the annular space defined between the inner wall of barrel 51 and the outer threaded wall of inner barrel 52. On one side receiving ring 56 carries an integral angled extension rod 73 which rises vertically above the plane of surface 72. Rod 73 extends inwardly spaced above surface 72 and curved to function as a finger stop bar.

Dispensing head 57 is a block of rigid plastic material of generally cylindrical appearance. About its periphery dispensing head 57 is provided with a groove 74 which is received by the inner edge of annular receiving ring 56 in a smooth, sliding, rotatable fit sufficiently tight to provide continuous sealing contact between receiving ring 56 and dispensing head 57. Thus receiving ring 56 rotatably retains dispensing head 57 over the open tops of barrels 51 and 52 thereby closing the interior of the assembly.

On its underside dispensing head 57 is provided with an annular boss 75 which is centered about the common axis of barrels 51 and 52 and shaft 53 and which is positioned aligned with the upper end of barrel 52. The under edge of boss 75 is provided with a series of radial splines 76 which mate tightly with splines 66 on the upper edge of inner barrel 52 thus separating the annular space between barrels 51 and 52 from the central space within barrel 52, and also retaining head 57 and inner barrel 52 together as a common rotatable unit.

Centrally on its under side dispensing head 57 is provided with a depending sleeve 77 which rotatably receives the upper end 68 of shaft 53. Between its outer edge and annular boss 75 the under side of dispensing head 57 is provided with an annular groove 78. Similarly between annular boss 75 and sleeve 77 the under side of dispensing head 57 is provided with an annular groove 79.

On its upper side, where it projects above the level of surface 72 of receiving ring 56, dispensing head 57 is centrall provided with a short, integral, vertical tube 80 which forms the dispensing orifice for container-dispenser 50. A series of inclined bores 81 extend through dispensing head 57 connecting groove 78 and the interior of orifice 80, thus providing expelling passages leading from the annular space between barrels 51 and 52 to dispensing orifice 80. Similarly a series of inclined bores 82 are provided in dispensing head 57 which lead from groove 79 on the under side of dispensing head 57 to orifice 80 thereby providing expelling passages for the central space within barrel 52. Orifice 80 can be provided with cap 83 which snap fits over orifice 80.

Dispensing head 57 is also provided with a series of arms 84 which are spaced at arcuate intervals about the periphery of dispensing head 57 and which extend outwardly from dispensing head 57 over upper surface 72 of receiving ring 56. Arms 84 are relatively thin vertically and are positioned such that they ride beneath the inner, stop bar, extension of angled rod 73. Arms 84 are relatively thick in a horizontal direction and along their left hand edges, as viewed from the center of rotation from dispensing head 57, are cut in a concave curve for receiving a finger tip which can thus be applied to rotate dispensing head 57 and consequently inner barrel 52 in a clockwise direction.

Annular piston 54 is positioned coaxially between barrels 51 and 52 and on its under side is shaped to fit flat against bottom 58 of barrel 51 entirely across the distance between barrels 51 and 52. The upper suface of piston 50 is shaped to fit snugly into groove 78 in dispensing head 57, and the center aperture of piston 54 is internally threaded as indicated by the reference numeral 85 to engage threads 64 on barrel 52. On its outer edge piston 54 is provided with a vertical slot 86 which snugly receives dispensing boss 49. Thus clockwise rotation of dispensing head 57, which by reason of the mating splines 66 and 76 rotates inner barrel 52 relative to outer barrel 51, causes piston 54 to rise in the annular space between barrels 51 and 52.

Piston 55 is positioned about shaft 53 across the central space within barrel 52 and like piston 54 is shaped on its under side to fit flat against the bottom 62 of barrel 52 extending between shaft 53 and the inner wall of barrel 52, and on its upper surface to fit snugly into groove 79 on the under side of dispensing head 57. The central aperture of piston 55 is internally threaded as indicated by the reference numeral 87 rotatably to engage threads 67 on shaft 53. The outer edge of piston 55 is provided with a vertical slot 88 which slidingly receives boss 65 on the inner wall of barrel 52. Since shaft 53 cannot rotate relative to outer barrel 51 by reason of the square cross-section 70 at its lower end received in square cross-sectioned well 60, clockwise rotation of dispensing head 57 thus rotates inner barrel 52 relative to shaft 53 and causes piston 55 to rise in the central space within barrel 52.

In operation receiving ring 56 is threadedly disengaged from outer barrel 51 to remove dispensing head 57. With pistons 54 and 55 at their lowermost positions, the annular space between barrel 51 and barrel 52 is charged with one material to be dispensed, and the central space within barrel 52 is charged with a second material to be dispensed. Dispensing head 57 is then repositioned over the assembly and receiving ring 56 threadedly engaged, securely on the upper end of barrel 51 bringing splines 76 tightly into engagement with splines 66. Thereafter when it is desired to dispense the contents of container-dispenser 50 with cap 83 removed, user places his finger against an arm 84 of dispensing head 57 (see Figure 8) and rotates dispensing head 57 clockwise. Pistons 54 and 55 are thereby raised simultaneously (see dashed line in Figure 6) forcing the contents of container-dispenser 50 upwardly and out through expelling passages 81 and 82 through orifice 80 where the separately contained charges are simultaneously dispensed (see Figure 8).

It will be observed that in so rotating dispensing head 57, the operator's finger pushing an arm 84 is prevented from doing so when it reaches the position of rod 73. Rod 73 thus acts as a stop and by initiating the dispensing action with the operator's finger positioned a preselected number of arms 84 counter-clockwise from rod 73, preselected multiples of a fixed increment of a dispensed material can be obtained, thus permitting the operator to pre-select a desired quantity of material to be dispensed.

It will be evident that the container-dispenser of my invention is susceptible to a number of obvious variations. Clearly the same arrangement can be employed to separately contain and simultaneously dispense more than two materials. Thus, for example, in the arrangement of Figures 6–8, central shaft 53 could be chosen with a larger diameter and hollowed. An additional shaft could then be placed within this hollowed central shaft and fixed to rotate with dispensing head 57, thus permitting operation of a third piston within the hollowed shaft 53 to expel a material contained within such shaft. It is also evident that the arrangements of threads and keys employed to drive each piston can be reversed. Thus, referring to Figures 1–5, the interior of outer barrel 11 could be threaded and the key placed upon the exterior of inner barrel 12. It is evident moreover that the key chosen need not be simply a boss extending lengthwise of a barrel. The surface of the barrel can be provided with a flat or can be prismatic. Also, instead of a boss, a groove might be employed with an appropriate lug placed upon the piston.

I claim:

1. A container-dispenser for separately storing and simultaneously dispensing fluent materials which includes an outer barrel, an inner barrel coaxially disposed and rotatably supported within the outer barrel whereby the inner surface of the outer barrel and the outer surface of the inner barrel define walls enclosing an annular space, a shaft coaxially disposed within the inner barrel whereby the outer surface of said shaft and the inner surface of the inner barrel define walls enclosing a central space within said inner barrel, means on said outer barrel supporting said shaft in fixed angular position relative to the axis of said outer barrel, a first annular piston positioned in said annular space cooperating between the walls thereof, first keying means keying one said wall of said annular space with said annular piston to prevent relative rotation therebetween, means threadedly engaging said annular piston with the other said wall of said annular space, a second annular piston positioned in said central space cooperating between the walls thereof, second keying means keying one said wall of said central space with said second annular piston to prevent relative rotation therebetween, means threadedly engaging said second annular piston and the other wall of said central space, an operator member rotatably mounted exteriorly of said outer barrel extending through an end thereof in fixed engagement with said inner barrel whereby rotation of said operator member relative to said outer barrel causes relative rotation between said inner barrel and said outer barrel and between said inner barrel and said shaft to drive said first and second annular pistons in the same direction through said annular and central spaces respectively, a dispensing head mounted adjacent to an end of said outer barrel separately closing said outer and inner barrels to define separate fluent material chargeable spaces within said annular and central spaces between said end and said first and second pistons respectively, means in said dispensing head defining an expelling passage leading from said annular space, and means in said dispensing head defining an expelling passage leading from said central space.

2. A container-dispenser according to claim 1 in which said dispensing head and operator member are a unit.

3. A container-dispenser according to claim 1 in which said dispensing head is located on one end of said barrels and is affixed to said outer barrel and in which said operator member is located at the other end of said barrels.

4. A container-dispenser according to claim 1 in which first keying means is a boss extending lengthwise of a wall of said annular space and a slot on said first piston receiving said boss.

5. A container-dispenser according to claim 1 in which said second keying means is a boss extending lengthwise of a wall of said central space and a slot on said second piston receiving said boss.

References Cited in the file of this patent
UNITED STATES PATENTS
2,826,339   Maillard _____ Mar. 11, 1958